United States Patent Office 3,223,456
Patented Dec. 14, 1965

3,223,456
CONVEYING APPARATUS FOR FINE-GRANULAR MATERIAL
Hans Sonnenschein, Mulheim (Ruhr), Germany, assignor to Siemens-Schuckertwerke Aktiengesellschaft, Berlin-Siemensstadt, Germany, a corporation of Germany
Filed Nov. 14, 1963, Ser. No. 323,801
12 Claims. (Cl. 302—17)

My invention relates to equipment for conveying fine-granular mass particles for various purposes relating, for example, to chemical processing or to the utilization of granular material such as steel, sand, quartz and ceramic particles as a heat carrier in heat-exchanging systems. Such purposes often require moving the particle mass between respective spaces of different pressures or between different height levels.

There are known methods of conveying fine-granular particles that cause the particles to whirl in a conveying duct by means of a gas flow so that the particles are entrained and conveyed by a rapidly advancing flow. Such conveying methods require relatively large quantities of air or other gas which renders them unsuitable in many cases.

In such cases, a more advantageous and likewise known method of conveyance is to have the mass particles gathered in the conveying duct so as to form a particle column which is lifted as a result of a pressure difference between respective spaces located beneath and above the conveying duct, thus lifting the mass-particle column while avoiding a whirling about of the particles.

This conveying principle, involving only slight gas losses due to leakage while flowing through the particle column, can be readily employed only in duct portions that are straight or only slightly curved because otherwise the friction and mutual displacing effect of the mass particles imposes an appreciable limitation upon the applicability of this type of conveying method. It is, therefore, a serious problem, and one of the objects of my invention, is to pass the mass particles through a necessarily strongly curved supply or feeder duct into the conveying duct proper, the latter being straight or departing only slightly from a straight extent. At the same time, in the curved feeder duct, a substantially continuous flow of particle material is maintained to secure thereby a sufficiently dense gathering of the particles in the conveying duct proper. This achieves the desired slight gap volume between the particles in the column that are to rise in the conveying duct due to the pressure difference maintained between its lower and upper ends.

Another object of my invention, akin to the one mentioned above, is to eliminate the difficulties heretofore encountered in employing a rising conveying duct for lifting a column of mass particles by pressure difference. For example in cases where the mass particles supplied to the conveying duct, enter into the conveying duct from a chamber or channel located lower than the inlet opening of the conveying duct such as the particles employed in a heat-exchanging system or in a chemical processing plant.

To achieve these objects, as well as the further objects and advantages apparent from the following, I provide according to a feature of my invention, a particle-mass feeder device which has a material-containing chamber located ahead of the upwardly extending conveyor duct and comprises a U-shaped or in any event reversely curved feeder-duct means that connects the chamber with the lower end of the conveyor duct. It has its bight or flow-direction reversing portion at substantially the lowest location so that the particle material when flowing through the feeder duct means passes first downwardly from the chamber and then reverses its flow direction to pass upwardly into the conveying duct proper. I further provide the feeder device with a pressure-gas supply means communicating with the feeder duct means near the bight portion, and also with the pressure-gas outlet which is located at a higher level in the feeder-duct leg joined with the conveying duct. Thus it is located, relative to the particle travel direction, ahead of the column of particle material to be lifted. As a result, the flow of gas which passes through the particle material in the feeder duct means between the gas inlet and the gas outlet promotes the directional reversal of the particle flow in the curved portion of the feeder device. The flow of gas, as well, lifts the mass in the conveyor duct under the conjoint effect of the above-mentioned pressure difference.

The invention thus affords a conveying operation during which the mass particles within the feeder device are gathered shortly before they enter into the upright conveyor duct proper, and reliably imparts to the particle flow the desired reversal in flow direction, while passing the particles substantially in a closed piston-tight flow into the conveying duct. This is accomplished without necessitating the use of a greatly increased gas quantity at an increased pressure gradient for performing the conveying operation proper. The gas employed for the additional flow between the gas inlet and gas outlet of the feeder-duct means can be ducted away from the feeder device after being subjected to a relatively slight pressure loss, and can then be employed for other purposes, if desired.

According to another feature of my invention, the feeder duct means in apparatus according to the invention are preferably formed by an angular, U- or V-shaped tubular structure whose two legs depart from each other only by a slight angle, so that both generally extend in a vertically upward direction from the bight. One of the two legs is provided with gas-permeable walls in the end region adjacent to the conveying duct proper and a suitable gas outlet duct is joined with the gas-permeable walls. The gas supply means for the feeder duct are preferably joined with that duct at the lower end of the same leg.

According to another feature of my invention, an increased conveying power or capacity, even when using only one conveying duct proper, is achieved by providing the feeder device with a plurality of curved feeder-duct means. Each one connecting the material supply chamber with the inlet of the conveying duct proper and each provided with the above-mentioned gas inlet and outlet means.

According to still another feature of the invention, at least one nozzle is provided within the feeder device for reducing the pressure of the additional flow of pressure medium (gas). Such a nozzle affords acceleration of the mass particles supplied within flows of pressure medium, and serves to sluice or shoot the particles into the conveying duct proper.

The pressure differences required for producing the additional gas flow for promoting the feeding of the mass particles into the conveying duct can be derived from pressure differences existing in the plant where the particle-mass conveyor according to the invention is located. However, if necessary or desirable, the required pressure differences may also be produced by means of separate blowers.

The above-mentioned and further objects, advantages and features of my invention, said features being set forth with particularity in the claims annexed hereto, will be apparent from, and will be described in, the following with reference to embodiments of apparatus according to the invention illustrated by way of example on the accompanying drawings in which:

Figures 1, 4:
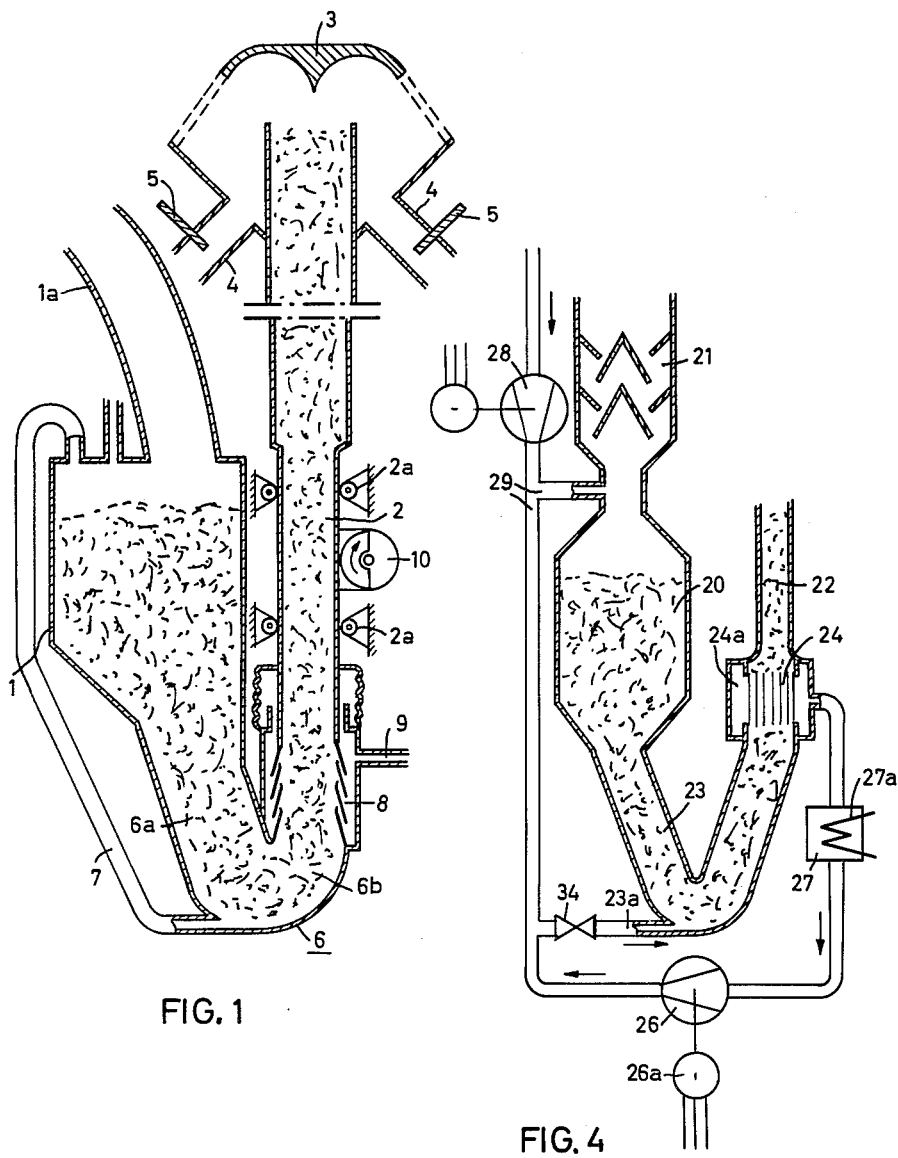
FIG. 1 shows schematically in vertical section a relatively simple conveying system for mass particles.
FIG. 4 shows in section a conveyor plant in which an additional blower is provided for producing the additional gas flow in the feeder device.

The feeder device of the conveyor plant illustrated in FIG. 1 comprises a container 1 for the fine-granular particles to be conveyed. From the collecting chamber formed by the container 1, the mass of material passes into a vertical conveyor duct 2, in which the particle mass is to be lifted from the collecting chamber to a higher level. For example, in a two-chamber regenerator plant for gas turbines, the container 1 may serve to receive the mass particles that have become cooled in an air-heater portion of the regenerator, and the conveyor duct 2 may serve to pass the cool particle mass to a different portion of the regenerator which is traversed by the hot waste gases of the gas turbine, thereby heating again the mass particles then to be employed as heat carrier in the heat exchanger for pre-heating the air. The chamber in container 1, which receives the mass particles through a supply duct 1a from a different portion of the plant, is under some superatmospheric pressure corresponding to that in the other portion of the plant. The conveyor duct 2 terminates upwardly below a deflector cap 3 which diverts the lifted mass particles issuing from the duct 2, into outlet conduits 4, each being equipped with a control or regulating member 5 here illustrated as a damper that permits adjusting the effective cross section of the conduit. At the upper end of the conveyor duct 2 within the deflector cap 3, there obtains a lower pressure than in the container 1. The pressure difference between the collecting chamber in container 1 and the space beneath the deflector cap 3 is utilized for lifting the mass particles that have entered into the bottom portion of the conveyor duct 2. That is, the column of particles in duct 2 is gas-permeable only to a slight extent and consequently is lifted by the static gas pressure active beneath the particle column.

With conveying devices of the type described so far, it is difficult and often troublesome to reliably have the mass particles pass from the collecting chamber in container 1 under the effect of their own gravity into the bottom portion of the upright conveyor duct 2 when a certain quantity of conveyed material passes through the deflector portion 3 into the outlet conduits 4.

According to the invention, a reliable feeding travel from container 1 to the column of material in the conveyor duct 2 is achieved by connecting the container 1 with the duct 2 by a feeder device whose material-guiding portion consists essentially of a tubular and generally U-shaped body 6 into whose left leg 6a the particle material drains from the container 1 by gravity. The right leg 6b of the tubular feeder duct extends at a very small angle to the leg 6a and communicates with the conveyor duct 2. A smallest feasible angle between the two legs 6a and 6b is advantageous for avoiding dead gas spaces and for complete filling of the tubular body with mass particles. A gas line 7 communicates with the bottom or bight portion of the feeder duct for supplying gaseous pressure medium. In the illustrated embodiment the gas line 7 communicates with a top of the container 1 so that the bight portion of the feeder duct 6 is supplied with air under the pressure, for example four to five atmospheres (above ambient pressure) obtaining in the container 1. The leg 6b of the feeder duct is provided with gas-permeable walls shortly ahead of the conveyor duct 2 proper. These gas-permeable walls may consist of porous ceramic material, but in the illustrated embodiment are formed of a jalousie structure 8 whose individual slats are downwardly inclined to prevent the escape of particle material. A jacket space surrounding the gas-permeable walls or jalousie 8 is connected to an outlet line 9 which may be connected to a portion of the plant in which a lower pressure obtains. For example, in a gas-turbine plant the line 9 may be connected to the line that supplies driving medium from the firing chamber to the gas turbine, or it may also be connected to a gas-turbine stage of suitably low pressure, whereas the container 1 is connected into the compressor line extending from the compressor and the firing chamber. That is assuming that the illustrated conveyor system serves for transporting the mass-particle flow between the chambers of a regenerator which utilizes the waste-gas heat of the turbine for the pre-heating of the combustion air.

The gas quantity supplied to the feeder duct 6 through the line 7 and leaving the feeder duct through the gas-permeable wall 8 and the line 9 has the effect of promoting and entraining the flow of the mass particles that have entered by gravity into the lower portion of leg 6a. The effect of the superimposed gas flow is so intensive that the movement of the particle mass at the locality where it reverses its direction, and up into the conveyor duct 2 is greatly promoted. Only little pressure gas is required in the conveyor duct 2 proper for conveying the particle column in the upward direction. By a stepwise increase of the duct cross section in the conveying direction of duct 2, this being shown in FIG. 1, the whirling of the particles in the duct can be avoided or greatly minimized. While in FIG. 1 only one supply line 7 for the pressure medium is indicated, a plurality of parallel gas lines are readily applicable if desired.

The performance of the feeder device, and consequently that of the entire conveying apparatus, can be improved considerably by providing for reduction of the resistances normally existing with respect to the travel of the mass particles. One way of doing this is to subject the conveyor duct 2 in the direction of the particle travel to periodic vibrations. This has the result of virtually fully eliminating the frictional effect of the duct wall upon the conveying travel. Accordingly, the apparatus shown in FIG. 1 is provided with a motor-driven vibration generator 10 consisting of a rotatable unbalanced fly wheel mounted on the duct 2. The duct 2 is vertically displaceable in roller guides 2a so that the operation of the generator 10 causes the duct to slightly vibrate. The duct 2 is preferably movable relative to the stationarily mounted feeder duct 6. For this purpose an expansible bellows 2b is schematically shown in FIG. 1, having one axial side firmly joined to the stationary feeder duct 6, and the other axial side firmly connected with the vertically vibratory conveyor duct 2.

Figure 2:
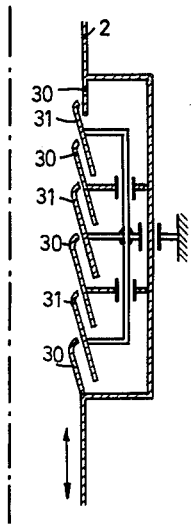
FIG. 2 illustrates in vertical section a gas-permeable wall portion of jalousie-type construction forming an outlet for the additional gas flow of the feeder device.

Due to frictional wear of the particles and other causes, the gas-permeable wall of the feeder device may become soiled. It is, therefore, preferable to provide suitable cleaning devices in order to make certain that the outlet for the additional gas quantity of the feeder device will remain open. This can be done, when the gas-permeable wall portions are formed by a jalousie or louvre structure, by providing them with means for moving the slats, this being the case in the embodiment exemplified by FIG. 2. The illustrated structure, applicable at the location 8 in apparatus otherwise corresponding to FIG. 1, comprises fixed slats 31 and movable slats 30. By moving the slats 30, any material lodged in the structure can be eliminated. The necessary movement can be effected by providing a suitable motor drive or by simply utilizing the above-described vibratory motion of the conveyor duct 2. Thus, in the embodiment shown in FIG. 2, the group of slats 30 are firmly joined with the duct 2, whereas the group of slats 31 are stationary, so that the vibration of the duct 2 causes a relative motion between the two groups of slats to take place.

Figure 3:
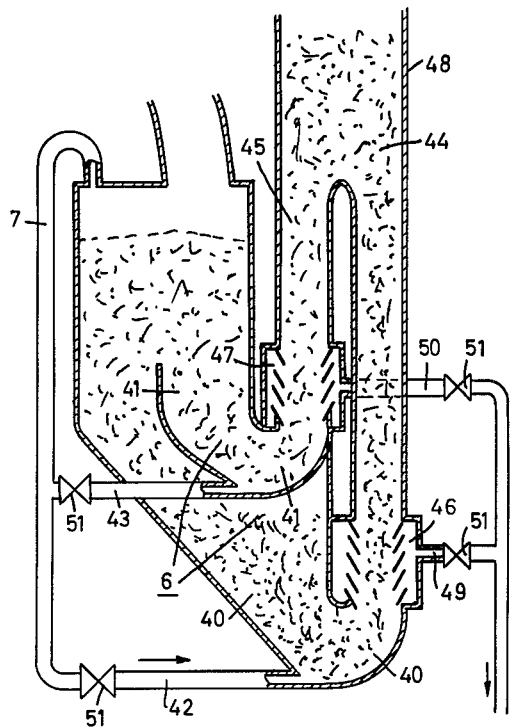
FIG. 3 shows schematically in vertical section a modified conveying system equipped with a feeder device for large conveying quantities employing a parallel flow of gas currents for feeding the particle mass into a common conveyor duct.

The embodiment shown in FIG. 3 affords a means of feeding relatively large flows of particle mass into a conveyor duct by means of a double feeder device. That is, the feeder device 6 is equipped with two generally U-shaped feeder ducts 40 and 41 which are separately supplied from pressure line 7 with gas through respective lines 42 and 43. The feeder ducts 40 and 41 communicate with two separate end branches 44 and 45 respectively in the lower portion 48 of the vertical conveyor duct. Gas-permeable wall portions 46 and 47 are provided in the respective leg ends adjacent to the branches 44 and 45 for the escape of the excessive amount of gas used for promoting the transport of the mass particles into the feeder-duct portions. The gas-permeable wall portions are surrounded by respective collector jackets which are connected to outlet lines 49 and 50. Since the duct portions 44 and 45 have respectively different lengths and the curved feeder ducts 40 and 41 are mounted at respectively different heights, controllable throttle valves or throttle bodies, all denoted by 51, are interposed in the respective gas lines 42, 43 and 49, 50. The throttle means 51 permit adjusting the gas pressures in the respective lines in accordance with the different conveying levels.

If a suitable pressure difference for producing the additional gas flow in the feeder device is not conveniently available, an auxiliary blower may be provided for this purpose, this being the case in the embodiment shown in FIG. 4.

The apparatus according to FIG. 4 is provided with a particle storage container 20 which receives the particle mass through lock chambers 21. From container 20 the particle mass is to be fed into a vertical conveyor duct 22 through a generally V-shaped feeder duct 23 of a feeder device according to the invention. The leg of the feeder duct adjacent to the conveyor duct 22 is provided at its upper end with a gas-permeable wall portion 24, preferably consisting of a louvre-type or jalousie-type assembly. The bight portion of the feeder duct 23 receives pressure gas through a line 23a. A suction blower 26 driven from an electric motor 26a circulates a gas current for the feeder device, this current being identified by arrows. The gas current enters through the line 23a into the feeder duct 23, passes through the gas-permeable wall portion 24 into an annular channel space 24a from which it is inducted into the blower 26 through a filter 27 which is preferably provided with a gas cooler 27a. Another blower 28 driven by a motor 28a supplies the equipment through a line 29 with the gas quantity required for the conveying operation and maintains the necessary static pressure.

The provision of the suction blower 26 affords a means of producing the required additional flow in a particularly effective manner. The pressure gradient can readily be adjusted to the value desired for the additional flow. A throttle valve 34 may be used for pressure adjusting purposes, and corresponding throttle valves may also be interposed at other localities of the gas-flow system.

Figure 5:
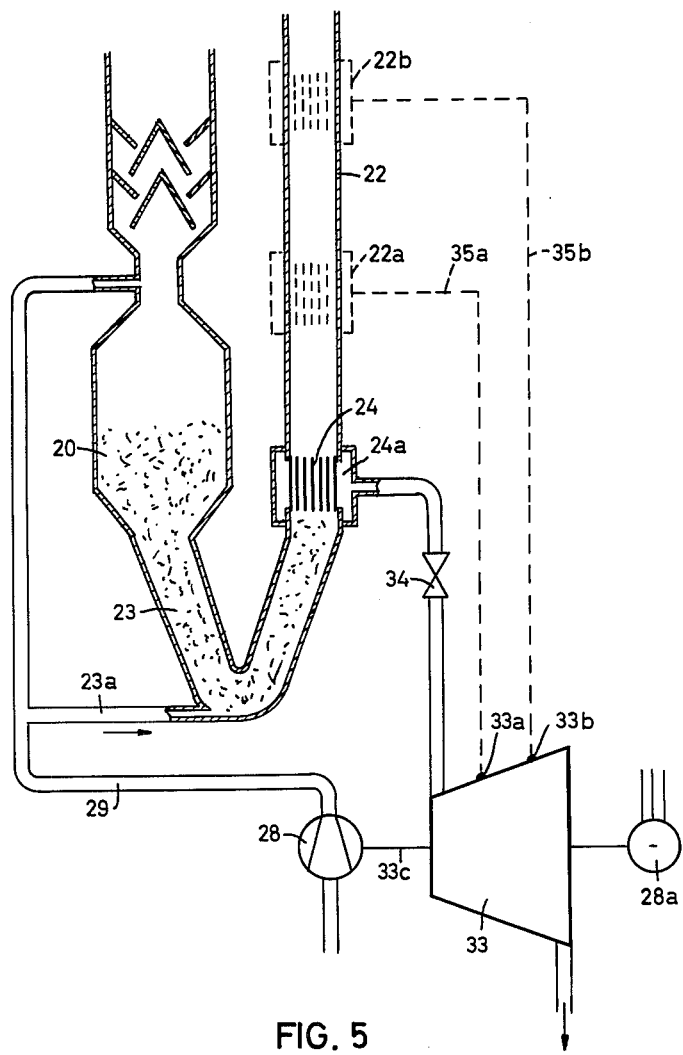
FIG. 5 shows schematically and in vertical section a conveying plant for mass particles in which the gas quantity required for the additional flow in the feeder device is taken from the low-pressure stage of a turbine.

Another way of producing the adidtional gas flow is incorporated in the embodiment according to FIG. 5. In this conveying appartaus, the feeder conduit 23 is supplied with a gas quantity under a given pressure through a line 29 from a blower 28. The proportion of gas thus supplied to the feeder conduit and passing through the gas-permeable wall 24 into the annular channel 24a is supplied to a pressure-reduction turbine 33 which converts the energy contained in the gas discharged from the additional flow, into mechanical power. The turbine 33 may be coupled with the shaft 33c of the gas blower or compressor 28 driven from the electric motor 28a and supplying the pressure gas to the feeder device.

As in the otherwise similar embodiment of FIG. 4, control means for the additional gas flow in the feeder device may be provided, for example in form of control valves 34, or also consisting of means for adjusting the blades in the compressor 28 or in the pressure-reduction turbine 33.

The provision of a pressure-reduction turbine in the outlet path of the gas flow utilized in the feeder conduit affords the additional possibility of withdrawing gas from the conveyor duct. This is in order to prevent disturbance of the conveying operation in the upper portion of the conveyor duct by whirling as may otherwise be caused by the volumetric change of the gas penetrating through the gap volume of the particle column being conveyed and simultaneously subjected to reduction in gas pressure. Such withdrawal of gas from the conveyor duct 22 is effected through gas-permeable walls and the withdrawn gas is supplied to corresponding stages of lower pressure in the pressure-reduction turbine. Gas-permeable wall portions for such withdrawal and the appertaining gas outlet chambers are indicated at 22a and 22b in FIG. 5, the respective gas lines 35a and 35b being connected to the corresponding inlet points 33a and 33b of the multi-stage turbine 33.

While in the above-described embodiments according to FIGS. 1 to 5 the additional gas flow of the feeder device acts upon a mass of already gathered mass particles, the feeder device may also be equipped with a nozzle which acts to entrain the mass particles into the jet of gas issuing from the nozzle and casts the particles into the opening of the conveyor duct located opposite the nozzle orifice. This principle of design and operation is incorporated in the embodiment of FIG. 6 in conjunction with a regenerator of a gas-turbine plant.

Figure 6:
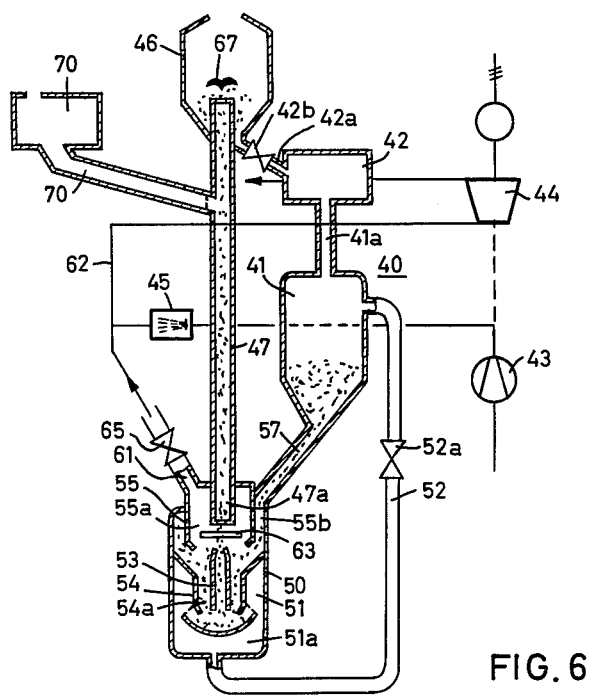
FIG. 6 shows in vertical section a particle-mass conveyor plant in which the feeder is equipped with a nozzle for accelerating the mass particles by gas injection into the conveyor duct.

Denoted in FIG. 6 by 41 and 42 are the two heat-exchanging chamber structures of a regenerator in which a circulatory flow of mass particles is employed as the heat carrier. The air for the gas-turbine plant, supplied by a compressor 43, is heated in the lower chamber 41 of the regenerator by intimate contact with the hot mass particles, before the heated air enters into the firing chamber 45 of the gas turbine 44. The waste gases from the turbine are used in the heat-exchanging chamber 42 of the regenerator to issue their residual heat to the now relatively cool mass particles as they travel on the circulatory flow path of the heat carrier. A conveyor duct serves for passing the mass particles which issue through a supply or drainage duct 57 from the lower regenerator chamber 41, up to the upper regenerator chamber 42. The conveyor duct 47 extends vertically upward into a collecting tank 46 which is connected to an outlet duct 42a with the regenerator chamber 42.

A feeder device 50 operates to pass the mass particles, arriving through duct 57 from the lower regenerator chamber 41, into the bottom opening of the conveyor duct 47.

The feeder device 50 comprises an outer jacket 51 which encloses a cylindrical space 51a. This space is connected by a gas line 52 with the heat-exchanger chamber 41 of the regenerator 40 in which the output pressure of the compressor 43 obtains. Mounted within the jacket 51 are a central vertical nozzle tube 53 and a downwardly open bell-shaped conduit structure 54 for supplying the mass particles. A cylindrical structure 55 extends from above into the jacket 51 and is open at the bottom. The lower end 47a of the vertical conveyor duct 47 protrudes downwardly some distance into the inner space 54a of the cylindrical structure 55. The nozzle opening at the top end of the nozzle tube 53 also extends somewhat into the interior 55a of structure 55 and is located axially opposite the bottom opening of the duct end 47a. The connecting duct 57 extends from the heat-exchanger chamber 41 of the regenerator into the annual space 55b between the cylindrical structure 55 and the jacket 51 for gravity feeding the mass particles into the feeder device. The annular space 55b opens into the particle supply channel 54a between the nozzle tube 53 and a surrounding wall portion 54.

Figure 7:
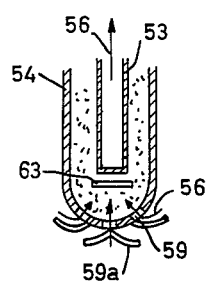
FIG. 7 shows separately a detail of the plant according to FIG. 6.

As is apparent from FIG. 7, the portion 54 has a number of openings 59 in its lower end through which respective air or gas currents 56 can enter into the lower end of the cylindrical guide wall 54. These gas currents whirl up the mass particles located in front of the nozzle tube 53 and these are then entrained by the gas flow so that they are flung into the conveyor duct 47.

To prevent the mass particles from dropping from the lower space of the guiding wall portion 54 through the openings 59, these openings are downwardly covered by baffle members 59a which permit the gas to pass through. The proper performance of the feeder device requires the existence of a pressure difference between the space 51a (FIG. 6) beneath the gas inlet openings 59 and the cylindrical annular chamber 55a which surrounds the lower end 47a of the conveyor duct as well as the nozzle tube 53. The necessary pressure difference can be produced by connecting the chamber space 55a through a line 61 behind the firing chamber 45 to the line 62 that supplies the driving medium to the gas turbine, because the pressure in the line 62 is lower than the pressure in the heat-exchanger chamber 41. This is due for example to the pressure drop in the firing chamber. Another condition for the required performance of the feeder device is the presence of a sufficiently high particle column in space 54a of the guiding wall portion 54 so that the chambers 55a and 51a are substantially separated from each other with respect to pressure conditions.

The nozzle tube 53 and the wall of the cylindrical structure 55 are arranged relative to each other as well as to the end portion 47a of the conveyor duct 47 in such a manner that any mass particles that may not have been flung into the conveyor tube 47, or any mass particles that may drop back from the conveyor duct, will enter into the annular gap space 54a between the conveyor duct 47 and the guiding wall portion 54.

It is preferable to mount a controllable stop disc 63 movably within the cylindrical chamber 55a of the feeder device to permit blocking the lower end of the conveyor tube by leaving a gas passage open. The blocking disc may serve, for example, to close the lower end of the conveyor duct in order to permit filling the duct with mass particles, using for this purpose an auxiliary feeder device 70 for starting-up operation. Prior to starting-up, a valve slider 65 in the line 61 extending from the cylindrical chamber 55a to the line 62 for the turbine driving medium, is to be closed. When air under pressure is supplied by the compressor 43 to the heat-exchanger chamber 41, this pressure is propagated through the line 57 into the space 55a. This pressure acts upon the mass particles in the conveyor tube, also when the blocking disc 63 is in the illustrated closing position between the nozzle tube 53 and the lower end of the conveyor duct. When thereafter the previously closed stop-gate 42b is opened, heat-carrier mass passes from the collecting tank 46 into the upper heat-exchanger 42 of the regenerator. Now the particle mass in the conveyor duct 47 is moved upward by the pressure. Located in the collecting tank 46 above the top end of the conveyor duct 47 is a distributor cap 67 which prevents a conveyance of particle material through the duct 47 when the collecting tank 46, being upwardly open toward the ambient atmosphere, is completely filled with particle material.

When the conveying operation is to be commenced, the shut-off device 42b in line 42a, and the shut-off member 65 in line 62 are opened, and the blocking disc 63 is moved away from the illustrated closing position so that it is no longer located between the nozzle tube 53 and the conveyor duct 47. The valve 52a in line 52 is likewise to be opened.

When particle material is drained from the collecting tank 46, the column of particles is lifted in the conveyor duct 47 and the feeder device commences to cast mass particles into the lower end of the conveyor duct. The air entering through slots or openings 59 in the lower portion of the guiding wall 54 according to FIG. 7, causes the mass particles at this location to become whirled up, and the expanding air entrains the particles into the nozzle tube 53. Thus the mass particles are accelerated and are cast into the lower end of the conveyor duct 47, thereby resulting in a relatively dense gathering of the particles in the conveyor duct. The flow resistance for the gas through the column of mass particles is relatively large. Consequently, the quantity of air employed for casting the mass particles into the conveyor duct escapes through the line 61 into the line 62 for the driving medium. This line is connected behind the firing chamber 45 and has a pressure which, due to the flow resistance in the firing chamber, is lower than the pressure in the line 52 leading to the feeder device.

Figure 8:
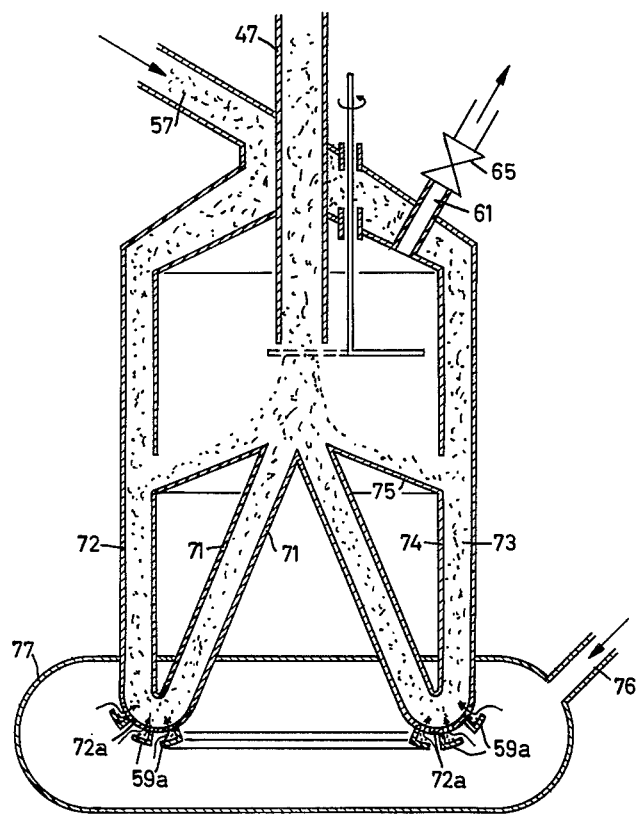
FIG. 8 shows a modified portion of a conveying plant otherwise similar to that of FIG. 6.

Difficulties may be encountered when employing a single nozzle tube 53 according to FIG. 6 for injecting the required quantity of mass particles into the conveyor tube 47, if a relatively large input of particle material through the feeder device is desired. In such cases it is preferable to employ a modified feeder nozzle assembly as shown in FIG. 8. According to FIG. 8, a nozzle tube is substituted by a ring-nozzle body 71. As a result, the lower portion of the nozzle structure extends along a greatly increased arcuate or annular area 72a of the guiding wall portion 72. A large number of openings for the passage of air can thus be provided along the annular or ring-shaped area so that large air quantities can be introduced into the ring-nozzle structure 71. This affords a supply of considerably increased air quantities for the purpose of whirling the mass particles, entering through an annular channel 73, and casting them into the lower portion of the conveyor tube 47. Cylindrical or conical wall components 74 and 75 are provided for properly limiting the flow channels for the mass particles. These wall portions return any particles that have not properly entered into the conveyor duct 47. Denoted by 76, in FIG. 8, is the gas supply line coming from the air heat exchanger and opening into the pressure space 77. Mounted in this pressure space are the end of the ring-nozzle body 71 as well as the cylindrical particle supply channel structure with the adjacent arcuate wall portion 72a. The supply line 57 for mass particles, the gas discharge line 61, in FIG. 8, correspond to the equally denoted components in FIG. 6, the line 61 being connected to the line 62 (FIG. 6) for the driving medium. The modification according to FIG. 8 is distinguished by the concentrating effect of the conical jet of particle-entraining air which the nozzle structure injects into the lower end of the conveyor duct 47. As also shown in FIG. 8, the blocking plate 63 may be turned into and out of the blocking position by means of a revolvable control shaft 63a which extends to the outside of the device.

For increasing the input of particle material in the feeder device, the apparatus according to FIG. 6 may also be modified by employing several nozzle tubes 53 in parallel arrangement, all directed toward the lower opening of the conveyor duct, for casting the mass particles into the duct.

It will be understood that the invention is not limited to the particular embodiments illustrated on the drawings and described above. For example, in the embodiment according to FIGS. 1 to 4, the gas-permeable walls may be formed of rods mounted parallel to the travel direction of the particles, and these rods may be arranged into groups of alternating rods, of which one group is movable relative to the other for the purpose of cleaning. It will also be understood that a feeder device according to the invention, comprising a generally U-shaped feeder duct or an equivalent duct structure in which a reversal in the direction of a particle flow takes place, is also applicable for purposes other than feeding the particles into a vertical conveyor duct. Such and other modifications will be obvious to those skilled in the art, upon a study of this disclosure, and are indicative of the fact that the invention can be given embodiments other than particularly disclosed herein, without departing from the essential features of my invention and within the scope of the claims annexed hereto.

I claim:

1. Apparatus for conveying particle material between spaces of respectively different pressure, comprising an upwardly extending conveyor duct in which a column of particle material is to be lifted by utilization of the pressure difference, a feeder device having a material supply chamber located ahead of said duct relative to the particle-conveying direction, said device having a generally U-shaped feeder duct whose two legs extend downwardly to its bight portion and extend both predominantly in an approximately vertical direction, said feeder device having pressure-gas supply means communicating with one of said legs near said bight portion, and said same leg having a gas-permeable wall upwardly spaced from said supply means and located ahead of said conveyor duct for producing in said feeder device a gas flow between said supply means and said permeable wall to promote the reversal of the material flow direction in said feeder duct and lifting of the particle mass in said conveyor duct, said gas-permeable wall being adapted to discharge substantially all of said gas flow before reaching said conveyor duct.

2. Apparatus for conveying particle material between spaces of respectively different pressure, comprising an upwardly extending conveyor duct in which a column of particle material is to be lifted by utilization of the pressure difference, a feeder device having a material-supply chamber located ahead of said duct relative to the particle-conveying direction, said device having feeder duct means comprising a first duct portion connected to said chamber and extending in a given direction for conveying the particle material along a path in said given direction and a second duct portion communicating at one end with said first duct portion and at its other end with said conveyor duct, said second duct portion extending in a direction intersecting said given direction of said first duct portion for changing the direction of the particle material conveying path from said given direction to said intersecting direction when passing from said chamber to said conveyor duct, said feeder device having pressure-gas inlet means communicating with said feeder duct means near the intersection of the respective directions of said duct portions and having pressure-gas outlet means located at said other end of said second duct portion for producing in said feeder device an auxiliary gas flow between said gas inlet and outlet means to promote the directional reversal of the particle mass in said feeder duct and the lifting of the mass in said conveyor duct, said pressure gas outlet means being adapted to discharge substantially all of said auxiliary gas flow before reaching the conveyor duct.

3. In apparatus for conveying particle material according to claim 2, the two spaces of respectively different pressure between which the material is to be conveyed being respective chambers of a heat exchanger in which the particle mass serves as a heat carrier, said material supply chamber of said feeder device being in pressure communication with the heat-exchanger chamber of the higher pressure, and the top of said conveyor duct being in pressure communication with the other heat-exchanger chamber, said gas inlet means being connected to the pressure of said supply chamber, whereby operational pressure differences of the heat exchanger are utilized for moving the particle column in said conveyor duct as well as for producing said auxiliary gas flow in said feeder device.

4. Particle-mass conveying apparatus according to claim 2, comprising a pressure reduction turbine connected to said gas outlet means for converting the energy of the spent auxiliary gas flow into mechanical work, and gas impeller means connected in said gas inlet means for impelling said auxiliary gas flow, said turbine being in driving connection with said impeller means to provide part of the impelling power.

5. In apparatus for conveying particle material according to claim 2, said feeder duct means comprising an injection nozzle having a nozzle opening directed toward but spaced from the lower end of said conveyor duct for casting the particle material in an accelerated gas jet into said conveyor duct, said pressure-gas inlet means communicating with said feeder duct means below said nozzle to entrain particle material into and through the nozzle, and said gas outlet means being in communication with said second nozzle portion between said nozzle opening and said conveyor duct.

6. In apparatus for conveying particle material according to claim 2, said feeder duct means comprising a nozzle structure having an annular nozzle channel extending upwardly and having a decreasing channel diameter in the upward direction, said nozzle structure having a channel opening at the top directed toward, but spaced from, the lower end of said conveyor duct, and said nozzle structure having an annular base portion provided with perforations at the bottom of said nozzle channel, said perforations being in communication with said pressure-gas supply means, a wall structure surrounding said nozzle structure and forming together therewith an annular interspace communicating with said chamber to receive particle material therefrom, said annular interspace forming also a return passage for particles cast through said nozzle opening toward said conveyor duct but missing said conveyor duct.

7. Particle-mass conveying apparatus according to claim 2, comprising gas impeller means in one of said gas inlet and outlet means for producing said auxiliary gas flow in said feeder device.

8. Particle-mass conveying apparatus according to claim 7, comprising a gas circulation cystem which includes said gas inlet means and outlet means for recirculating said gas flow through said feeder device, said circulation system comprising said gas impeller means and having pressure control means for adjusting the pressure drop of said auxiliary flow in said feeder device.

9. In apparatus for conveying particle material according to claim 2, said feeder duct means comprising a nozzle tube having a nozzle opening upwardly directed toward the lower end of said conveyor duct but being spaced therefrom, a wall structure surrounding the lower end of said nozzle tube and forming together therewith an annular interspace communicating with said chamber to receive particle material therefrom, said wall structure having beneath said nozzle tube a portion with perforations communicating with said pressure-gas supply means for causing the gas to entrain and accelerate particle material into the nozzle tube and through the nozzle opening into said conveyor duct, said annular interspace forming also a return passage for particles missing said conveyor duct.

10. Particle-mass conveying apparatus according to claim 9, comprising a controllable closure plate between said nozzle opening and said conveyor duct, said plate being displaceable from an inactive position away from the gas-jet path of said nozzle tube to an active position beneath said conveyor duct and forming a closure for particle material while retaining a gas passage when in said active position.

11. Apparatus for conveying particle material between spaces of respectively different pressure, comprising an upwardly extending conveyor duct in which a column of particle material is to be lifted by utilization of the pressure difference, said conveyor duct having a bottom portion branching into a plurality of downwardly extended branch portions terminating at respectively different heights, a feeder device having a material-supply chamber located ahead of said duct relative to the particle-conveying direction, said feeder device having a plurality of generally U-shaped feeder ducts connecting said chamber with the respective lower ends of said branch portions, each of said feeder ducts having a lowermost bight portion in which the flow of material draining from said chamber reverses the flow direction to pass upwardly to said conveyor duct, and each of said feeder ducts having pressure-gas inlet means communicating with said bight portion and having pressure-gas outlet means upwardly spaced from said bight portion in the direction toward said conveyor duct for producing in said feeder duct between said gas inlet means and outlet means an auxiliary gas flow to promote the directional reversal of the particle flow and the lifting of the particle mass in said conveyor duct.

12. Particle-mass conveying apparatus according to claim 11, comprising respective controllable throttle members in said gas inlet means and said gas outlet means for said plurality of feeder ducts in order to permit adjusting the gas pressures to the differences in height.

References Cited by the Examiner
UNITED STATES PATENTS
| | | | |
|---|---|---|---|
| 2,420,145 | 5/1947 | McAfee | 302—53 |
| 2,751,257 | 6/1956 | Peterson | 302—17 |
| 2,770,503 | 11/1956 | Bourguet | 302—17 |

FOREIGN PATENTS
| | | |
|---|---|---|
| 942,154 | 2/1949 | France. |

SAMUEL F. COLEMAN, *Primary Examiner.*

ANDRES H. NIELSEN, *Examiner.*